United States Patent
Kim et al.

(10) Patent No.: US 10,217,983 B2
(45) Date of Patent: Feb. 26, 2019

(54) CROSS-LINKED COMPOUND PARTICLE AND SECONDARY BATTERY INCLUDING THE SAME

(71) Applicant: LG Chem, Ltd., Seoul (KR)

(72) Inventors: Seok Koo Kim, Daejeon (KR); Eun Ju Lee, Daejeon (KR); Bokkyu Choi, Daejeon (KR); Sei Woon Oh, Daejeon (KR); Je Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/784,772

(22) PCT Filed: Jul. 25, 2014

(86) PCT No.: PCT/KR2014/006774
§ 371 (c)(1),
(2) Date: Oct. 15, 2015

(87) PCT Pub. No.: WO2015/012625
PCT Pub. Date: Jan. 29, 2015

(65) Prior Publication Data
US 2016/0126519 A1    May 5, 2016

(30) Foreign Application Priority Data
Jul. 26, 2013  (KR) ................ 10-2013-0088507

(51) Int. Cl.
| | | |
|---|---|---|
| H01M 2/16 | (2006.01) | |
| H01M 4/60 | (2006.01) | |
| H01M 10/0525 | (2010.01) | |
| H01M 10/0565 | (2010.01) | |
| H01M 10/052 | (2010.01) | |
| H01M 10/0567 | (2010.01) | |
| H01M 10/42 | (2006.01) | |

(52) U.S. Cl.
CPC ......... H01M 2/1653 (2013.01); H01M 4/602 (2013.01); H01M 4/604 (2013.01); H01M 4/608 (2013.01); H01M 10/052 (2013.01); H01M 10/0525 (2013.01); H01M 10/0565 (2013.01); H01M 10/0567 (2013.01); H01M 10/4235 (2013.01); H01M 2220/20 (2013.01); H01M 2300/0082 (2013.01); Y02T 10/7011 (2013.01)

(58) Field of Classification Search
None
See application file for complete search history.

(56) References Cited

U.S. PATENT DOCUMENTS

| | | | |
|---|---|---|---|
| 4,588,639 A | 5/1986 | Ozono | |
| 5,037,716 A | 8/1991 | Moffat | |
| 2003/0064314 A1* | 4/2003 | VanDusen | G03G 9/113 |
| | | | 430/137.13 |
| 2005/0095504 A1 | 5/2005 | Kim et al. | |
| 2008/0118334 A1 | 5/2008 | Bonora | |
| 2011/0129729 A1 | 6/2011 | Kim et al. | |
| 2013/0344391 A1* | 12/2013 | Yushin | H01M 4/366 |
| | | | 429/231.8 |

FOREIGN PATENT DOCUMENTS

| | | |
|---|---|---|
| EP | 0631339 A2 | 12/1994 |
| JP | S62169147 A | 7/1987 |
| JP | H03164749 A | 7/1991 |
| JP | H06283206 A | 10/1994 |
| JP | H10270084 A | 10/1998 |
| JP | 2005230687 A | 9/2005 |
| KR | 2005-0041661 A | 5/2005 |
| KR | 2007-778450 B1 | 11/2007 |
| KR | 2008-0033645 A | 4/2008 |
| KR | 2008-0037213 A | 4/2008 |
| KR | 2009-0012182 A | 2/2009 |

OTHER PUBLICATIONS

Germain et al., "High Surface Area Nanoporous Polymers for Reversible Hydrogen Storage", Chem. Mater. 2006, 18, 4430-4435.*
JP H10-270084—Translation.*
International Search Report from PCT/KR2014/006774, dated Nov. 27, 2014.
Extended Search Report from European Application No. 14829970.4, dated Oct. 12, 2016.
"Emulsion polymerization." Wikipedia, the free encyclopedia, Jul. 20, 2013, XP055307525, retrieved from the Internet: URL:https://en.wikipedia.org/w/index.php?title=Emulsion_polymerization&oldid=565048994 [retrieved on Oct. 4, 2016].
Zhao, Yi, et al., "Encapsulation of Self-Healing Agents in Polymer Nancapsules." SMALL, vol. 8, No. 19, Jul. 9, 2012, pp. 2954-2958, XP055307451, DE ISSN: 1613-6810, DOI: 10.1002/smll.201200530.

* cited by examiner

*Primary Examiner* — Ladan Mohaddes
(74) *Attorney, Agent, or Firm* — Lerner, David, Littenberg, Krumholz & Mentlik, LLP

(57) ABSTRACT

Disclosed are a cross-linked compound particle and a secondary battery including the same. More particularly, a compound particle which includes a monomer and a polymerization initiator, as a core and a film including a material disappeared at predetermined temperature as a shell is provided.

14 Claims, No Drawings

CROSS-LINKED COMPOUND PARTICLE AND SECONDARY BATTERY INCLUDING THE SAME

CROSS REFERENCE TO RELATED APPLICATIONS

The present application is a national phase entry under 35 U.S.C. § 371 of International Application No. PCT/KR2014/006774, filed Jul. 25, 2014, which claims priority from Korean Patent Application No. 10-2013-0088507, filed Jul. 26, 2013; the disclosures of which are incorporated herein by reference.

TECHNICAL FIELD

The present invention relates to a cross-linked compound particle and a secondary battery including the same.

BACKGROUND ART

As mobile device technology continues to develop and demand therefor continues to increase, demand for secondary batteries as energy sources is rapidly increasing. Among these secondary batteries, lithium secondary batteries which exhibit high energy density and a high operation potential, long lifespan and low self-discharge ratio are commercially available and widely used.

In addition, as interest in environmental problems is recently increasing, research into electric vehicles (EVs), hybrid EVs (HEVs), and the like that can replace vehicles using fossil fuels, such as gasoline vehicles, diesel vehicles, and the like, which are one of the main causes of air pollution, is actively underway. As a power source of EVs, HEVs, and the like, a nickel metal-hydride secondary battery is mainly used. However, research into lithium secondary batteries having high energy density, high discharge voltage and output stability is actively underway and some lithium secondary batteries are commercially available.

In general, lithium secondary batteries may be classified into lithium-ion batteries containing liquid electrolytes per se, lithium-ion polymer batteries containing liquid electrolytes in the form of gels, and lithium polymer batteries containing solid electrolytes, depending upon types of electrolytes. Particularly, the lithium-ion polymer batteries (or gel polymer batteries) have various advantages such as high safety due to lower probability of fluid leakage as compared to liquid electrolyte batteries, and feasible ultra-thinning and compactness of the battery shape and substantial weight reduction of the battery, which thereby lead to increased demands thereof.

Lithium ion batteries are prepared by impregnating an electrode assembly including a porous separator disposed between a positive electrode and a negative electrode, each of which is coated with an active material, on an electrode current collector in a liquid electrolyte solution including a lithium salt.

Meanwhile, methods of manufacturing lithium ion polymer batteries are broadly classified into a method of manufacturing a non-crosslinked polymer battery and a method of manufacturing a directly-crosslinked polymer battery, depending upon kinds of matrix material for electrolyte impregnation. As the polymer matrix material, acrylate- and methacrylate-based materials having excellent radical polymerization reactivity, and ether-based materials having superior electrical conductivity are mainly used. In particular, the latter directly-crosslinked polymer battery is manufactured by placing a jelly-roll type or stack type electrode assembly composed of electrode plates and a porous separator in a pouch, injecting a thermally polymerizable polyethylene oxide (PEO) based monomer or oligomer cross-linking agent and an electrolyte composition thereto, and thermally curing the injected materials. The battery has advantages in manufacturing processes in that plates and separators of conventional lithium ion batteries can be directly employed without particular modification or alteration. However, this method is known to suffer from disadvantages in that, when the crosslinking agent is not cured and thus remains in the electrolyte, it is difficult to achieve uniform impregnation due to increased viscosity, thereby significantly decreasing characteristics of the battery.

Therefore, there is an urgent need for technology to secure stability of a battery by resolving the problems while maintaining overall battery performance.

DISCLOSURE

Technical Problem

Therefore, the present invention has been made to solve the above problems and other technical problems that have yet to be resolved.

The present invention aims to provide a cross-linked compound particle which has superior electrolyte solution impregnation and does not exhibit deteriorated battery characteristics, and a secondary battery including the same.

Technical Solution

In accordance with one aspect of the present invention, provided is a compound particle including a monomer and a polymerization initiator, as a core and a film including a material disappeared at predetermined temperature as a shell.

The monomer may be at least one selected from the group consisting of ethylene oxide, acrylic acid, acrylonitrile, methacrylic acid, vinylidene fluoride, methyl methacrylate, fluoride, siloxane, phosphazene, imides, sulfide, acetate, succinate and the like, or may be at least one selected from the group consisting of copolymers thereof.

The polymerization initiator may be a photoinitiator, a thermoinitiator, an oxidation-reduction reaction initiator, a radiation initiator or a mixture thereof.

The photoinitiator may be at least one selected from the group consisting of α-hydroxyketone-based compounds, phenyl glyoxylate-based compounds, benzyl dimethyl ketal-based compounds, α-amino ketone-based compounds, monoacyl phosphine-based compounds, bisacyl phosphine-based compounds, phosphine oxide-based compounds, metallocene-based compounds and iodonium salts.

The thermoinitiator may be at least one selected from the group consisting of axo-based compounds, peroxy-based compounds, tert-butyl peracetate, peracetic acid and potassium persulfate.

The oxidation-reduction reaction initiator as a material forming a radical through reaction with $Fe^{2+}$ may be a persulfate compound or hydroperoxide.

The radiation may be X-rays, alpha particle gamma rays or high-energy electron rays.

The film may include a thermoplastic resin.

The thermoplastic resin may be at least one selected from the group consisting of polyethylene (PE), polyvinyl chloride (PVC), polypropylene (PP), polystyrene (PS), polyacrylonitrile (PAN), styrene-acrylonitrile (SAN), acrylonitrilebutadiene-styrene (ABS), polymethyl methacrylate (PMMA), polytetrafluoroethylene (PTFE) and polychlorotrifluoroethylene (PCTFE).

The film may include a vanadium compound.

The vanadium compound may be at least one selected from the group consisting of vanadium(II) chloride, vanadium(III) chloride, vanadium tetrachloride, vanadium(II) bromide, vanadium(III) bromide, vanadium tetrabromide, vanadium(II) iodide and vanadium(III) iodide.

The film may be a copolymer of a thermoplastic resin and a vanadium compound.

The core may further include a foaming agent.

The foaming agent may be at least one selected from the group consisting of azodicarbonamide (ADCA), azobisisobutyronitrile (AZDN), N,N'-dimethyl-N,N'-dinitroso-terephthalate (NTA), 4,4'-oxybis(benzenesulfonyl hydrazide (OBSH), 3,3'-sulfonbis(benzene-sulfonyl hydrazide, 1,1-azobisformamide (ABFA)-(azodicarbonamide), p-ttoluenesulfonyl semicarbazide and barium azodicarboxylate (BaAC).

A thickness of the film may be 1 μm to 10 μm.

A thickness of the film may be 2 μm to 5 μm.

The temperature may be 60° C. to 300° C.

The temperature may be 70° C. to 270° C.

The compound particle may be included in at least one selected from the group consisting of an electrolyte, an electrode and a separator.

The compound particle may be mixed with an electrode active material.

The compound particle may be included in a coating layer formed on a surface of an electrode.

In accordance with another aspect of the present invention, provided is a battery including the compound particle.

The battery may have a structure wherein an electrode assembly including a positive electrode, a negative electrode and a polymer layer disposed between the positive electrode and the negative electrode is accommodated in a battery case and sealed, and may include a lithium salt-containing non-aqueous electrolyte.

In general, the positive electrode is prepared by drying after coating a mixture of a positive electrode active material, a conductive material and a binder, as an electrode mixture, on a positive electrode current collector. In this case, as desired, the mixture may further include a filler.

Examples of the positive electrode active material may include layered compounds such as lithium cobalt oxide ($LiCoO_2$) and lithium nickel oxide ($LiNiO_2$) or compounds substituted with one or more transition metals; lithium manganese oxides represented by $Li_{1+x}Mn_{2-x}O_4$ where $0 \leq x \leq 0.33$, such as $LiMnO_3$, $LiMn_2O_3$, and $LiMnO_2$; lithium cuprate ($Li_2CuO_2$); vanadium oxides such as $LiV_3O_8$, $LiV_3O_4$, $V_2O_5$, and $Cu_2V_2O_7$; Ni-site type lithium nickel oxides having the formula $LiNi_{1-x}M_xO_2$ where M=Co, Mn, Al, Cu, Fe, Mg, B, or Ga, and $0.01 \leq x \leq 0.3$; lithium manganese composite oxides having the formula $LiMn_{2-x}M_xO_2$ where M=Co, Ni, Fe, Cr, Zn, or Ta, and $0.01 \leq x \leq 0.1$ or the formula $Li_2Mn_3MO_8$ where M=Fe, Co, Ni, Cu, or Zn; spinel-structure lithium manganese composite oxides represented by $LiNi_xMn_{2-x}O_4$; $LiMn_2O_4$ where some of the Li atoms are substituted with alkaline earth metal ions; disulfide compounds; $Fe_2(MoO_4)_3$; and the like, but embodiments of the present invention are not limited thereto.

The positive electrode current collector is generally fabricated to a thickness of 3 to 500 μm. The positive electrode current collector is not particularly limited so long as it does not cause chemical changes in the fabricated lithium secondary battery and has high conductivity. For example, the positive electrode current collector may be made of stainless steel, aluminum, nickel, titanium, sintered carbon, aluminum or stainless steel surface-treated with carbon, nickel, titanium, or silver, or the like. The positive electrode current collector may have fine irregularities at a surface thereof to increase adhesion between the positive electrode active material and the positive electrode current collector. In addition, the positive electrode current collector may be used in any of various forms including films, sheets, foils, nets, porous structures, foams, and non-woven fabrics.

The conductive material is generally added in an amount of 1 to 50 wt % based on the total weight of a mixture including a positive electrode active material. There is no particular limit as to the conductive material, so long as it does not cause chemical changes in the fabricated battery and has conductivity. For example, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide whiskers and potassium titanate whiskers; conductive metal oxides such as titanium oxide; conductive materials such as polyphenylene derivatives; and the like may be used.

Meanwhile, the graphite based material having elasticity may be used as the conductive material and may be used with the other materials.

The binder is a component assisting in binding between an active material and the conductive material and in binding of the active material to a current collector. The binder is typically added in an amount of 1 to 50 wt % based on the total weight of the mixture including the positive electrode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit positive electrode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The present invention also provides a secondary battery including the electrode, and the secondary battery may be a lithium ion battery, a lithium ion polymer battery, or a lithium polymer battery.

In general, lithium secondary batteries include a positive electrode, a negative electrode, a separator disposed between the positive electrode and the negative electrode, and a lithium salt-containing non-aqueous electrolyte. The other components of the lithium secondary batteries will be described below.

The negative electrode may be prepared by coating, drying and pressing a negative electrode active material on a negative electrode current collector. As desired, the conductive material, the binder, the filler and the like described above may be selectively further included.

Examples of the negative electrode active material include carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me:

Mn, Fe, Pb, or Ge; Me': Al, B, P, Si, Group I, II and III elements, or halogens; $0 \leq x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials; titanium oxides; lithium titanium oxides; and the like, particularly carbon based materials and/or Si.

The negative electrode current collector is typically fabricated to a thickness of 3 to 500 μm. The negative electrode current collector is not particularly limited so long as it does not cause chemical changes in the fabricated battery and has conductivity. For example, the negative electrode current collector may be made of copper, stainless steel, aluminum, nickel, titanium, sintered carbon, copper or stainless steel surface-treated with carbon, nickel, titanium, or silver, and aluminum-cadmium alloys. Similar to the positive electrode current collector, the negative electrode current collector may also have fine irregularities at a surface thereof to enhance adhesion between the negative electrode current collector and the negative electrode active material and may be used in various forms including films, sheets, foils, nets, porous structures, foams, and non-woven fabrics.

The separator is disposed between the positive electrode and the negative electrode and, as the separator, a thin insulating film with high ion permeability and high mechanical strength is used. The separator generally has a pore diameter of 0.01 to 10 μm and a thickness of 5 to 300 μm. As the separator, for example, sheets or non-woven fabrics, made of an olefin-based polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

The lithium salt-containing non-aqueous electrolyte consists of a non-aqueous electrolyte and lithium. As the non-aqueous electrolyte, a non-aqueous organic solvent, an organic solid electrolyte, an inorganic solid electrolyte or the like may be used, but the present invention is not limited thereto.

Examples of the non-aqueous organic solvent include non-aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte and examples thereof include, but are not limited to, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imides In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the lithium salt-containing non-aqueous electrolyte. If necessary, in order to impart incombustibility, the electrolyte may further include halogen-containing solvents such as carbon tetrachloride and ethylene trifluoride. Further, in order to improve high-temperature storage characteristics, the non-aqueous electrolyte may further include carbon dioxide gas, and fluoroethylene carbonate (FEC), propene sultone (PRS) and the like may be further included.

In one specific embodiment, a lithium salt-containing non-aqueous electrolyte may be prepared by adding a lithium salt such as $LiPF_6$, $LiClO_4$, $LiBF_4$, $LiN(SO_2CF_3)_2$, or the like to a mixed solvent including EC or PC, which is a high dielectric solvent and a cyclic carbonate, and DEC, DMC, or EMC, which is a low viscosity solvent and a linear carbonate.

The present invention may provide a battery pack including the battery and a battery pack including the battery module and a device using the battery pack as a power source.

In this regard, particular examples of the device include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

MODE FOR INVENTION

Now, the present invention will be described in more detail with reference to the accompanying drawings. These examples are provided for illustrative purposes only and should not be construed as limiting the scope and spirit of the present invention.

Example 1

Preparation of Positive Electrode $Li(Ni_6Mn_2Co_2)O_2$ as a positive electrode active material, carbon black as a conductive material and PVdF as a binder were added to n-methyl-2-pyrrolidone (NMP) in a weight ratio of 94:3:3 and mixed, thereby preparing a positive electrode mixture.

After coating the prepared positive electrode mixture on aluminum foil having a thickness of 12 μm as a positive electrode current collector to a thickness of 66 μm, rolling and drying were carried out, thereby manufacturing a positive electrode.

Preparation of Negative Electrode

Natural graphite as a negative electrode, carbon black as a conductive material, styrene butadiene rubber (SBR) and carboxymethyl cellulose (CMC) were added to deionized $H_2O$ (distilled water) in a weight ratio of 94.5:2:2:1.5 and mixed, thereby preparing a negative electrode mixture.

Copper foil having a thickness of 10 μm was used, and the prepared negative electrode mixture was coated onto the negative electrode current collector in a thickness of 73 μm. Subsequently, rolling and drying were carried out, thereby manufacturing a positive electrode.

Preparation of Secondary Battery

An SRS separator (film material: Toray, inorganic layer: LG chemistry, total thickness: 16 um) was disposed between the negative electrode and the positive electrode, thereby manufacturing an electrode assembly. Subsequently, the electrode assembly was accommodated in a pouch type battery case. Subsequently, a mixture of ethyl carbonate, dimethyl carbonate and ethylmethyl carbonate mixed in a volumetric ratio of 3:2:5 as an electrolyte solution, and a non-aqueous lithium electrolyte solution including 1 M $LiPF_6$ as a lithium salt were used. Compound particles including an acrylonitrile monomer (AN) as a core and a polyacrylonitrile (PAN) film formed to a thickness of 2 μm as a shell were added thereto, thereby manufacturing a lithium secondary battery.

Example 2

A lithium secondary battery was manufactured in the same manner as in Example 1, except that surfaces of positive and negative electrodes were coated without addition of the compound particles to the electrolyte solution.

Comparative Example 1

A lithium secondary battery was manufactured in the same manner as in Example, except that an electrolyte solution not including the compound particles was used.

Comparative Example 2

A lithium secondary battery was manufactured in the same manner as in Example, except that azobisisobutyronitrile (AZDN) as an additive was injected and an electrolyte solution not including the compound particles was used.

Experimental Example 1

Lifespan Characteristic Evaluation Experiment

The batteries manufactured in each of Examples 1 and 2, and Comparative Examples 1 and 2 were charged and discharge 500 times at 45° C. and 0.5° C. Subsequently, 300×- and 500× discharge capacity maintenance ratios with respect to once-discharged capacity were calculated, and results thereof are summarized in Table 1 below.

Experimental Example 2

Evaluation Experiment of High-Temperature Storage Characteristics

The batteries manufactured according to each of Examples 1 and 2, and Comparative Examples 1 and 2 were stored for 3 weeks at 60° C. in a full charge state, and then a resistance increase ratio and a thickness increase ratio thereof were measured. Results are summarized in Table 1 below.

TABLE 1

|  | Inclusion of electrolyte solution additive (wt %) | Inclusion of compound particle | Discharge capacity ratio at each cycle with respect to once-discharge capacity (%) | | Resistance increase after storing for 3 weeks at 60° C. (%) | Thickness increase after storing for 3 weeks at 60° C. (%) |
| --- | --- | --- | --- | --- | --- | --- |
|  |  |  | 300 times | 500 times |  |  |
| Example 1 | 2% | Inclusion (electrolyte solution) | 90 | 80 | 14% | 3% |
| Example 2 | 2% | Inclusion (electrode) | 90 | 82 | 13% | 3% |
| Comparative Example 1 | 0% | None | 92 | 81 | 14% | 3% |
| Comparative Example 2 | 2% | None | 74 | 52 | 180% | 240% |

As shown in Table 1, it can be confirmed that the batteries according to Examples 1 and 2, in which the compound particles including 2 wt % of the mixture of the monomer and polymerization initiator were added to the electrolyte or coated on the electrode, and the battery according to Comparative Example 1, in which the monomer and the polymerization initiator were not added, exhibit higher capacity, when compared with the battery according to Comparative Example 2, in which 2 wt % of the mixture of the monomer and the polymerization initiator was added to the electrolyte solution. Accordingly, it can be confirmed that the shell prevents that the core material deteriorates battery performance, and thus, characteristics of the batteries are improved.

This is since the battery according to Comparative Example 2, in which the monomer and the polymerization initiator were directly added to the electrolyte solution, exhibits increased viscosity through addition of the additive, and thus, sufficient impregnation of the electrolyte solution is difficult and gas is massively released due to continuous decomposition during high-temperature storage.

It can be confirmed that, from the lifespan and high-temperature storage characteristic results, the batteries according to Examples 1 and 2 in which the concentrations of the additives were properly controlled by including the compound particle including the monomer and the polymerization initiator exhibit excellent characteristics.

Experimental Example 3

The battery according to each of Examples 1 and 2 and Comparative Examples 1 and 2 was subjected to a nail penetration test in a fully charged state. Results are summarized in Table 2 below.

TABLE 2

| | Inclusion of electrolyte solution additive (wt %) | Inclusion of compound particle | Nail penetration test result | Highest temperature of battery during nail penetration test |
|---|---|---|---|---|
| Example 1 | 2% | Inclusion (electrolyte solution) | Not ignited | 73° C. |
| Example 2 | 2% | Inclusion (electrode) | Not ignited | 69° C. |
| Comparative Example 1 | 0% | None | Ignited | 540° C. (ignited) |
| Comparative Example 2 | 2% | None | Not ignited | 65° C. |

As shown in Table 2, it can be confirmed that the battery including the monomer and the initiator as a core is not ignited in the nail penetration test. Accordingly, it can be confirmed that the batteries according to Examples 1 and 2, which are not ignited during the nail penetration test and do not exhibit deteriorated battery performance, have improved characteristics, when compared with the battery according to Comparative Example 2 which is not ignited during the nail penetration test but exhibits deteriorated battery performance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, a compound particle according to the present invention may provide a cross-linked compound particle which has superior electrolyte solution impregnation and does not exhibit deteriorated battery characteristics, and a secondary battery including the same.

The invention claimed is:

1. A compound particle comprised in an electrolyte for a lithium-ion polymer battery, wherein the compound particle comprises:
   a monomer and a polymerization initiator, as a core; and
   a film as a shell,
   wherein the monomer is acrylonitrile,
   wherein the film comprises a thermoplastic resin that is polyacrylonitrile (PAN), and
   wherein the polymerization initiator is a photoinitiator, a thermoinitiator, a radiation initiator or a mixture thereof.

2. The compound particle comprised in an electrolyte for a lithium-ion polymer battery according to claim 1, wherein the photoinitiator is at least one selected from the group consisting of α-hydroxyketone-based compounds, phenyl glyoxylate-based compounds, benzyl dimethyl ketal-based compounds, α-amino ketone-based compounds, monoacyl phosphine-based compounds, bisacyl phosphine-based compounds, phosphine oxide-based compounds, metallocene-based compounds and iodonium salts.

3. The compound particle comprised in an electrolyte for a lithium-ion polymer battery according to claim 1, wherein the thermoinitiator is at least one selected from the group consisting of axo-based compounds, peroxy-based compounds, tert-butyl peracetate, peracetic acid and potassium persulfate.

4. The compound particle comprised in an electrolyte for a lithium-ion polymer battery according to claim 1, wherein the radiation initiator is at least one selected from the group consisting of X-rays, alpha particle gamma rays and high-energy electron rays.

5. The compound particle comprised in an electrolyte for a lithium-ion polymer battery according to claim 1, wherein the film further comprises a vanadium compound.

6. The compound particle comprised in an electrolyte for a lithium-ion polymer battery according to claim 5, wherein the vanadium compound is at least one selected from the group consisting of vanadium(II) chloride, vanadium(III) chloride, vanadium tetrachloride, vanadium(II) bromide, vanadium(III) bromide, vanadium tetrabromide, vanadium (II) iodide and vanadium(III) iodide.

7. The compound particle comprised in an electrolyte for a lithium-ion polymer battery according to claim 1, wherein the film is a copolymer of a thermoplastic resin and a vanadium compound.

8. The compound particle comprised in an electrolyte for a lithium-ion polymer battery according to claim 1, wherein the core further comprises a foaming agent.

9. The compound particle comprised in an electrolyte for a lithium-ion polymer battery according to claim 8, wherein the foaming agent is at least one selected from the group consisting of azodicarbonamide (ADCA), azobisisobutyronitrile (AZDN), N,N'-dimethyl-N,N'-dinitroso-terephthalate (NTA), 4,4'-oxybis(benzenesulfonyl hydrazide (OBSH), 3,3'-sulfonbis(benzene-sulfonyl hydrazide, 1,1-azobisforamide (ABFA)-(azodicarbonamide), p-ttoluenesulfonyl semicarbazide and barium azodicarboxylate (BaAC).

10. The compound particle comprised in an electrolyte for a lithium-ion polymer battery according to claim 1, wherein a thickness of the film is 1 μm to 10 μm.

11. The compound particle comprised in an electrolyte for a lithium-ion polymer battery according to claim 1, wherein a thickness of the film is 2 μm to 5 μm.

12. A lithium-ion polymer battery comprising the compound particle according to claim 1.

13. A battery pack comprising the lithium-ion polymer battery according to claim 12.

14. A device using the battery pack according to claim 13 as a power source.

* * * * *